Patented Jan. 26, 1937

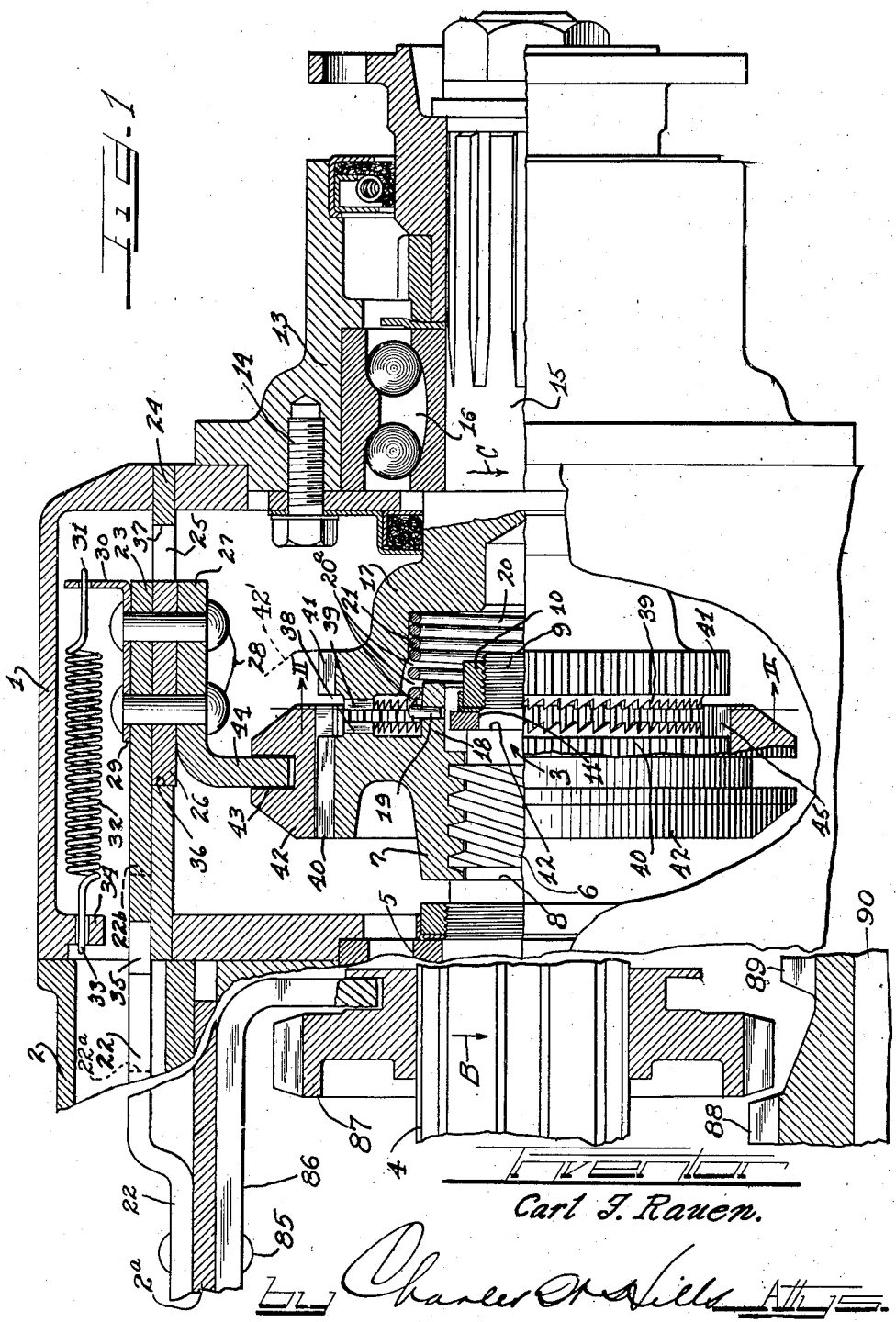

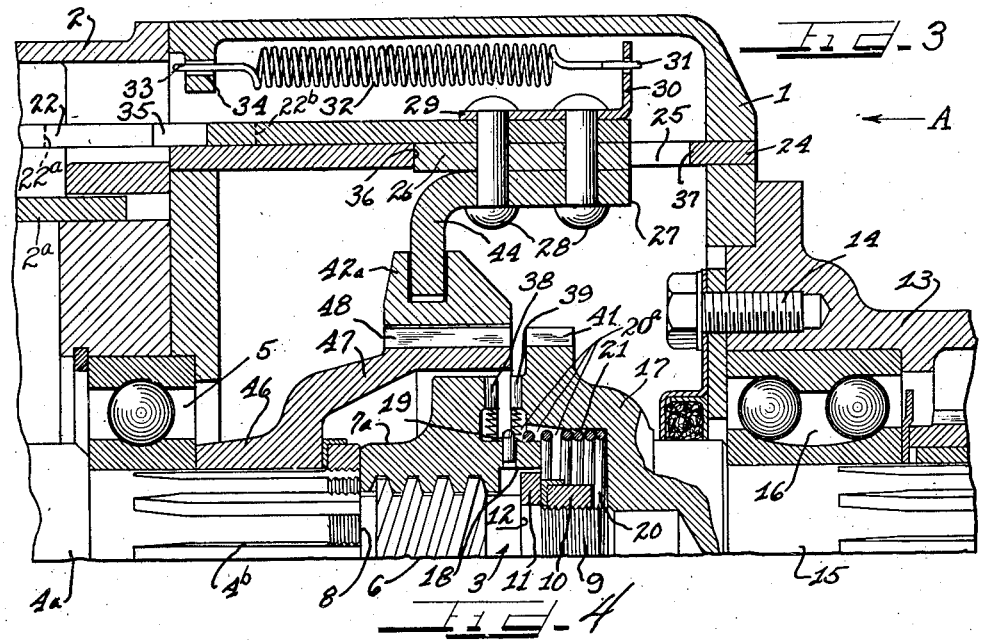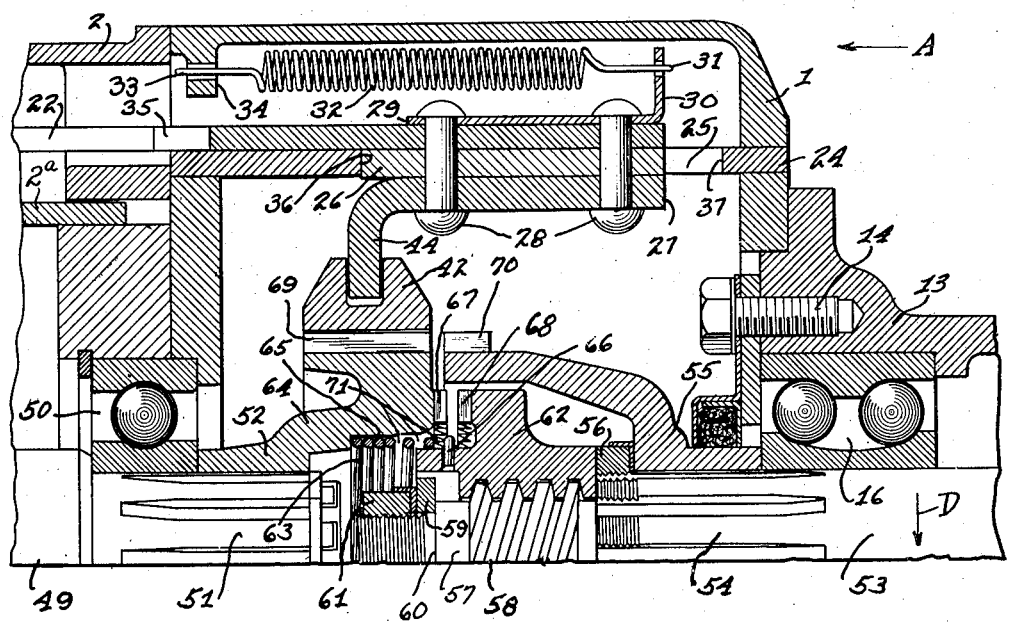

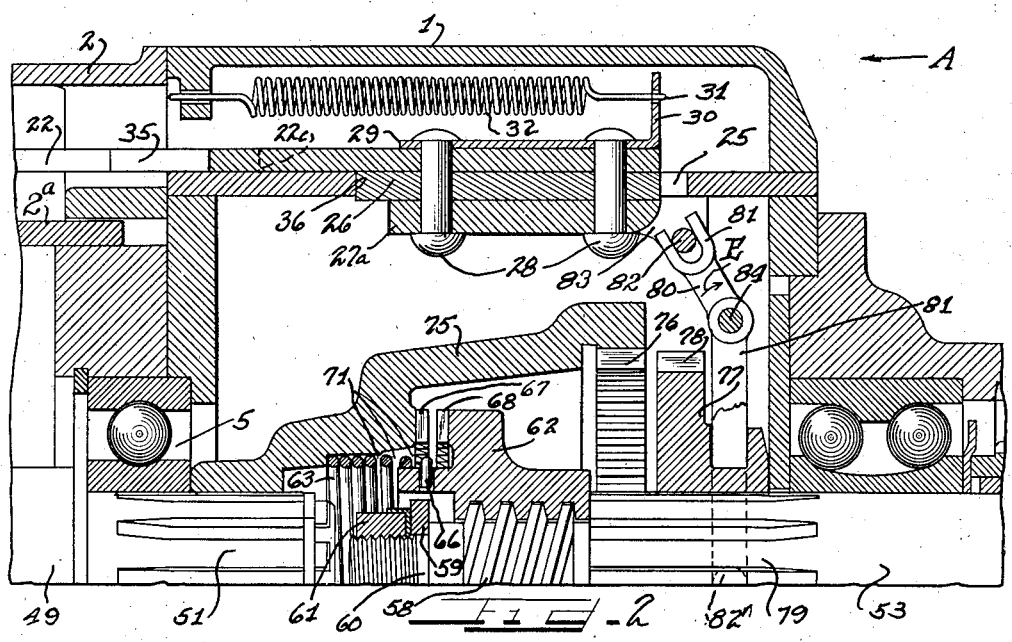

2,068,869

UNITED STATES PATENT OFFICE 2,068,869

MECHANISM FOR POWER TRANSMISSION

Carl F. Rauen, Grosse Pointe, Mich.

Application May 25, 1932, Serial No. 613,392

19 Claims. (Cl. 192—48)

This invention has to do with transmissions and is concerned more particularly with a mechanism employed in conjunction with an automobile or like transmission mechanism for providing a one-way overrunning or free wheel drive between the engine shaft and the propeller shaft.

It is one of the objects of the invention to provide a construction of this character by which a free wheeling drive embodying a minimum number of parts may be established.

Another object of the invention resides in the provision of a screw type one-way overrunning clutch embodying friction means for insuring operation or interengagement of the clutch parts while offering a negligible amount of resistance to rotation of the parts when one is overrunning the other.

It is a further object of the invention to provide a screw type free wheeling mechanism in which a friction device having a much greater gripping action in one direction of rotation than in the other is employed to insure proper operation of the mechanism.

A further object of the invention is to provide lockout mechanism in connection with the free wheeling instrumentalities, whereby the latter may be rendered inoperative automatically when the transmission is shifted to reverse speed setting.

A further object of the invention is to provide a free wheeling mechanism of this character embodying means for rendering the free wheeling instrumentalities ineffective and means for automatically rendering the last named means inoperative.

Other objects of the invention will appear as the description proceeds.

In accordance with the general features of the invention, drive and driven shafts are provided with instrumentalities such that when the drive shaft rotates in one direction one of said instrumentalities is shifted by a cam movement into driving relationship with the other shaft and thereby establishes a driving relationship between the two shafts, and when the other of said shafts drives in the same direction, said instrumentality is repelled from the last mentioned shaft whereby the latter is permitted to rotate independently of the first shaft, thereby establishing a free wheeling drive between the shafts. Means slidably splined to one of the shafts is shiftable when the shift in the transmission is made to the reverse speed setting to be drivably connected with the other shaft so that the free wheeling instrumentalities are locked out when the automobile is driven in reverse speed, and means are provided for automatically returning the unit to a condition of free wheeling when the transmission has been shifted out of reverse speed setting.

Somewhat modified forms of the invention briefly described above appear in the accompanying drawings, in which Figure 1 is a fragmentary view, partly in section and partly in elevation, of a device constituting one form of the invention.

Figure 2 is a sectional view taken approximately in the plane indicated by the line II—II in Figure 1.

Figures 3, 4, and 5 are views of modified forms of the invention.

Figure 6 is a fragmentary view of a modified form of certain teeth shown in Figure 2.

Referring now more particularly to the drawings, wherein the same parts are designated throughout by the same reference characters, there is shown a casing 1 secured to the rear end of the transmission casing 2 by any suitable means such as bolts (not shown) and into which the rear end 3 of the transmission main shaft 4 projects. Said end 3 is journalled at 5 at the junction of the casings 1 and 2, and is formed within the casing 1 with a thread 6 of high pitch and constituting, in effect, a cylindrical cam on which a follower or sleeve 7 is loosely threaded. A shoulder 8 on the end 3 and located forwardly of the thread 6 serves to limit forward movement of the sleeve 7. The rear extremity of the main shaft end 3 is threaded at 9 to receive a nut 10, a collar 11 being held against the shoulder 12 by said nut to thereby provide a limit for the rearward movement of the sleeve 7.

An extension 13, secured at 14 to the casing 1, cooperates with the latter to receive a tail shaft 15 journalled in the extension 13 at 16. The tail shaft 15 is coaxial with the transmission main shaft 4 and is hollowed out at 17 to receive the rear end of the main shaft.

The sleeve 7 is provided with a rearward extension 18 to which one end 19 of a clutch spring 20 is anchored, a major portion of the spring 20 being received in the hollow portion 17 of the tail shaft 15, and the other end of said spring being free. The spring 20 is so constructed that it normally snugly engages the interior wall 21 of the hollow portion 17.

In the description that follows, the terms "clockwise" and "counter clockwise" are employed to designate directions of rotation from the standpoint of one looking from the rear toward the front of the vehicle in which the mechanism under consideration is employed, that is, as indicated by the arrow A in some of the various figures. The shift rail 22, by which low and reverse speeds of the transmission are established, is shown in neutral position. Aligned with and in the path of movement of the shift rail 22 is a second shift bar 23 which is supported by a plate 24 secured to the casing 1. The plate 24 is provided with a guide slot 25 in which the guide rod 26 is slidably received. A shift rail 27 is riveted at 28 or otherwise suitably secured to both the bar 23 and rod 26 so that all three move as a unit along the plate 24. Also held by the rivets 28 is a bracket 29 having an offset portion 30 to which the rear end 31 of a spring 32 is fastened. The spring 32 has its forward end 33 secured to the forward portion of the casing 1 at 34. The spring 32 is at all times under tension and consequently constantly urges the second shift rail 27 to its forward position as shown in the drawings.

With the transmission low and reverse shift rail 22 in neutral, said rail is somewhat spaced from the bar 23 as shown at 35, and the shift rail 27 is in its forward position, with the rod 26 engaging the forward end 36 of the slot 25 in the plate 24. The throw of the shift rail 22 for establishing a reverse speed setting of the transmission is substantially equal to, but not greater than, the length of the clearance 35 plus the throw of the rail 27, so that when the shift to reverse speed is made, first the clearance 35 is taken up and then the shift rail 27 is moved to its rearmost position, the rod 26 being brought into engagement with the rear end 37 of the slot 25.

In the form of the invention appearing in Figure 1, the thread 6 is lefthanded and the spring 20 is righthanded. The sleeve 7 and forward portion 17 of the tail shaft 15 are provided with juxtaposed series of oppositely directed ratchet teeth 38 and 39, respectively, so arranged that, when the transmission main shaft is driven in a counter-clockwise direction as shown by the arrow B in Figure 1 and the teeth are interengaged, the teeth 38 will drive the teeth 39, but when the tail shaft 15 is the drive shaft, as when the car is coasting, the teeth 39 are cammed by and do not drive the teeth 38. If desired, said teeth 38, 39, may be individually symmetrically formed in the shape of a V as shown at 38ᵃ in Figure 6. The sleeve 7 and hollow portion 17 are provided with additional sets 40 and 41 of circumferentially arranged clutch teeth which may be of the same pitch diameter as shown or of different pitch diameters, as desired. A clutch sleeve 42 is slidably splined at all times to the sleeve 7 and is provided with a peripheral groove 43 in which the depending fork 44 of the shift rail 27 fits. The spline teeth 45 of the sleeve 42 are normally out of engagement with the teeth 41 of the tail shaft 15, as shown.

The operation of the instrumentalities shown in Figure 1 is as follows:

When the transmission low and reverse shift rail 22 is moved forwardly to the position shown by the dotted line 22ᵃ, thereby establishing low speed, it has no effect whatever on the bar 23. The engine (not shown) causes the transmission main shaft 4 to rotate in a counterclockwise direction as shown by the arrow B, and, due to the high pitch of the thread 6, the sleeve 7 is cammed to the rear. Any tendency of the sleeve 7 to rotate with the shaft 4 without relative axial movement, due to friction or inertia or both, is overcome by the spring 20 which, as heretofore stated, fits snugly in the tail shaft 15 and is anchored to the threaded sleeve 7. Clearance is provided at 20ᵃ between certain of the coils of the spring 20 to allow the threaded sleeve 7 to move to the rear relative to the tail shaft 15, and when the said sleeve reaches the collar 11, the teeth 38 and 39 are drivably interengaged. The spring 32 holds the said sleeve 42 against movement with the threaded sleeve 7. Thus a positive drive is established by the teeth 38 and 39 between the transmission main shaft and the tail shaft 15, whereby the vehicle is driven forward in low speed. It will, of course, be appreciated that identically the same operation takes place when the transmission mechanism is set for second or third speed, except that the low and reverse shift rail 22 will, of course, occupy the full line position as shown in Figure 1.

When the vehicle employing this construction starts to coast in a forward direction, the tail shaft 15 rotates in a counterclockwise direction as shown by the arrow B on the main shaft 4 whereupon the sleeve 7 will rotate with respect to the transmission main shaft 4 in the same direction and will be shifted along the thread 6 to the left until the position shown in Figure 1 is reached, thereby separating the teeth 38 and 39 and allowing the tail shaft 15 to overrun the transmission main shaft 4. The spring 20 being coiled in a righthanded direction as above explained, the tendency of the counterclockwise movement of the tail shaft 15 is to reduce the diameter of the spring 20 and thereby reduce or release the grip of the spring 20, so that the tail shaft 15 may overrun the same, the spring 20 being then constrained to rotate with the transmission main shaft 4 because of the anchoring of its end 19 to the sleeve 7 and thereby offering little or no drag to the tail shaft 15.

When the low and reverse transmission shift rail 22 is moved to establish reverse speed of the transmission, it is shifted from its full line position as shown in Figure 1 to the position indicated by the dotted line 22ᵇ in that figure, thereby first taking up the slack or clearance 35 and subsequently shifting the rail 27 until the guide rod 26 reaches the rear limit 37 of the slot 25, against the action of the spring 32. The fork 44 of the shift rail 27 carries with it the clutch sleeve 42 which assumes the position shown in dotted lines at 42′, in which position it couples the sleeve 7 and the tail shaft 15 thru the teeth 40 and 41 for simultaneous rotation in both directions, thereby preventing coasting or free wheeling. When the shift rail 22 is moved again to its neutral position, the clutch sleeve 42 is automatically returned to its neutral position by the spring 32. It will be understood, of course, that suitable means, such as a spring pressed ball or plunger, disposed in a recess in the shift rail or associated parts, not shown, but of conventional or any suitable design, will be employed for holding the transmission shift rail 22 in position for establishing reverse speed, so that the same will not be accidentally removed from that position by the spring 32. The latter acts to shift the rail 27 into its foremost position only when the transmission shift rail 22 is moved forwardly away from the bar 23.

A somewhat modified form of the invention is shown in Figure 3 wherein the transmission main shaft 4ᵃ is splined at 4ᵇ forwardly of its rear end 3. Instead of providing clutch teeth on the outer periphery of the threaded sleeve 7ᵃ in juxtaposition to the teeth 41 on the tail shaft 15, there is provided in this modified form of the invention a collar 46 which is splined to the part 4ᵇ of the transmission shaft 4ᵃ, said collar 46 having a hollow rearwardly extending portion 47 provided with peripheral clutch teeth 48 of the same pitch diameter as the teeth 41. Slidably splined at all times to the portion 47 of the collar 46 is a clutch sleeve 42ᵃ which is shiftable by the fork 44 into engagement with the teeth 41 in response to a shift of the transmission low and reverse shift rail 22 to establish reverse speed in the transmission, thereby preventing free wheeling and establishing a driving connection between the transmission main shaft 4ᵃ and the tail shaft 15 in both directions of rotation. The remaining instrumentalities of the form of the invention appearing in Figure 3 are substantially identical with those of the form appearing in Figure 1 and are like numbered and the mode of operation of the two forms is substantially the same.

In Figure 4 is shown a still further form of the invention which is similar to that shown in Figure 3 except that certain instrumentalities are reversed. In Figure 4 the transmission main shaft 49 is journaled at 50 at its rear end 51, the latter being splined and drivably receiving a collar 52. The tail shaft 53 is splined at 54 and drivably receives a collar 55. The collar 55 engages the bearing 16 at one end and has a shoulder which is engaged by a washer held thereagainst by a nut 56 threaded on the forward end of the splined portion 54, this construction being substantially identical with that shown at 4ᵇ and and 46 in Figure 3. The forward end 57 of the tail shaft 53 is constructed in a manner substantially identical with the rear end of the shafts 4 and 4ᵃ in the previously described forms of the invention, the thread 58 being lefthanded and of substantially high pitch to constitute, in effect, a cylindrical cam. A collar 59, held against the shoulder 60 of the end 57 by the nut 61, provides a forward limit of movement of the threaded sleeve 62, the forward end of the splined portion 54 serving as a rear limit therefor. A right hand coiled spring 63 is disposed in the hollow rear portion 64 of the collar 52 and normally snugly engages the interior surface 65 thereof, the forward end of the spring being free and the rear end 66 being anchored in the forward portion of the threaded sleeve 62.

The collar 52 and threaded sleeve 62 are provided with juxtaposed ratchet or other teeth 67 and 68, respectively, of a construction substantially identical with the teeth 38 and 39, or 38ᵃ, of the previously described forms of the invention, and the collars 52 and 55 are provided with peripheral teeth 69 and 70 of preferably the same pitch diameter. A clutch sleeve or ring 42 is at all times slidably splined to the collar 52 and is shiftable by the fork 44 into toothed engagement with the teeth 70 to thereby establish a driving connection between the shafts 49 and 53 in both directions of rotation.

The operation of this form of the invention is as follows:

When the transmission mechanism is set for a drive in a forward direction, the resistance offered initially by the threaded sleeve 62 to the rotation of the spring 63 with the collar 52 results in a slight uncoiling of the latter by the interior surface 65 of the collar 52, thereby increasing the grip of the same on the spring, which, through its anchored end 66, causes the threaded sleeve 62 to rotate independently of the tail shaft 53. The sleeve thus rides forward on the thread 58 as far as the collar 59, sufficient clearance 71 being provided between certain coils of the spring 63 for this purpose, so that the spring is axially energized and the teeth 67 and 68 are brought into driving relationship. As rotation of the transmission main shaft 49 continues, the teeth 68 of the threaded sleeve 62 are forcibly held in driving relationship with the teeth 67, the sleeve 62 being practically wedged with respect to the thread 58 on the tail shaft 53.

When the vehicle embodying this mechanism starts to coast, that is, when the tail shaft 53 startes to rotate faster than the transmission main shaft 49 and in the same counter clockwise direction as shown by the arrow D, the energy in the spring is released and the threaded sleeve 62 is initially held against rotation with the tail shaft 53 by the spring 63 which, as heretofore mentioned, fits snugly in the collar 52, so that the sleeve 62 is caused by the thread 58 to move toward the rear until it occupies the position shown in Figure 4. The teeth 67 and 68, of course, facilitate this rearward movement of the sleeve 62 and are thereby disengaged from each other so that rotation of the tail shaft 53 will not be communicated to the transmission main shaft 49 and the vehicle will be allowed to coast or free wheel.

Double directional drive between the shafts 49 and 53 when the transmission is set for reverse drive is accomplished as explained hereinabove automatically upon shift of the shift rail 22 of the transmission to its reverse position, and release of the lockout mechanism is also accomplished automatically when the rail 22 is brought out of reverse position, as explained hereinabove.

In the form of the invention appearing in Figure 5, the construction is identical with that of Figure 4 except that provision is made for movement of the lockout clutch sleeve or ring in a forward direction instead of a rearward direction as in the previously described forms of the invention.

The collar 52 of Figure 4 is elongated rearwardly and is given the shape shown at 75 in Figure 5 and is provided with internal clutch teeth 76. The collar 55 of Figure 4 is replaced in Figure 5 with a collar 77 provided with external clutch teeth 78 of substantially the same pitch diameter as the teeth 76, the collar 77 being splined at 79 to the tail shaft 53. A bell crank lever 80 is provided with a fork 81 the ends of whose arms are loosely and pivotally connected as at 82' to the collar 77. The other end of the bell crank lever 80 is also forked at 81 and has a lost motion pivotal connection at 82 with the rear extension 83 of the shift rail 27ᵃ. When the transmission low and reverse shift rail 22 is moved to reverse position as shown by the dotted line 22ᶜ in Figure 5, the bell crank lever 80 is rotated about its pivot 84 in the direction of the arrow E, thereby shifting the clutch sleeve 77 forward and bringing the clutch teeth 76 and 78 into interengagement, thereby establishing a double directional drive between the main shaft 49 and the tail shaft 53. When the shift rail 22 is returned from reverse position to that shown in full lines in Figure 5, the spring 32 automatically shifts the rail 27ᵃ to its foremost position as shown in full lines, thereby returning the clutch sleeve or ring 77 to its neutral or inoperative position as also shown in full lines.

The operation of the free wheeling instrumentalities employed in Figure 5 is identical with that for the construction shown in Figure 4.

It will be seen from the foregoing that in each of the modifications the construction is extremely simple and dependable, a minimum of parts being employed and involving no need for accurate machining, so that the same may be produced at a low cost of manufacture.

In the modification appearing in Figure 5, the bell crank lever is of such construction that a reduced throw of the rail 27ª is needed to shift the lock-out sleeve 77 a sufficient distance to properly clutch the collar 75. The clearance 35 for the throw of the gear shift rail 22 is correspondingly increased as shown. The dimensions may of course be varied as desired.

In Figure 1 a portion of the gear mechanism of the transmission is shown. The low and reverse shift rail 22 is slidably supported by a plate 2ª which is secured to the upper part of the transmission casing 2 in any suitable manner (not shown). The rail 22 is fastened as at 85 to the fork element 86, by which the low and reverse gear 87, slidably splined on the main shaft 4, is shiftable into mesh with the low speed gear 88 and the reverse idler (not shown) which is constantly meshed with the reverse gear 89 on the countershaft 90.

Devices of the general character herein described and heretofore employed have been provided with friction shoes to cause the clutch parts to interengage and in order to function properly the shoes have had a considerable drag which, during the free wheeling condition, has been sufficient to cause rotation of the parts, which should be free wheeling, with such speed that severe clashing of the gears upon shifting has resulted. The self-energizing device forming the subject matter of this invention is, as will be observed from the foregoing description, entirely free of this objection.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a power transmission mechanism, a radially and longitudinally expansible and contractible coil spring, a helical cam directed oppositely to said cam, a torque transmitting member coaxial with said cam, said spring being fixed to one of said members and frictionally engaged with the other of said members, whereby when the cam rotates in a direction causing the follower member to cause the spring to radially grip the other member, said spring serves as a drag, preventing rotation of the follower member and causing the same to axially compress the spring and approach the other member, said members having complemental clutch teeth engageable upon such approach, whereby the cam rotatably drives the other member.

2. A power transmission mechanism comprising a radially expansible and contractible coil spring, a helical cam directed oppositely to said spring, a follower member associated with the cam, a torque transmitting member coaxial with said cam, a portion of said spring and said follower member being relatively axially movable, another part of said spring being non-rotatable relative to the follower member, whereby when the cam rotates in a direction causing the follower member to cause said spring to radially grip the other member, said spring serves as a drag, preventing rotation of the follower member and causing the same and the first mentioned part of the spring to approach each other, said members having complemental clutch teeth engageable upon such approach, whereby the cam rotatably drives the other member.

3. A power transmission mechanism comprising a radially expansible and contractible coil spring, a helical cam directed oppositely to said spring, a follower member associated with the cam, a torque transmitting member coaxial with said cam, a portion of said spring and said follower member being relatively axially movable, another part of said spring being non-rotatable relative to the follower member, whereby when the cam rotates in a direction causing the follower member to cause said spring to radially grip the other member, said spring serves as a drag, preventing rotation of the follower member and causing the same and the first mentioned part of the spring to approach each other, said members having complemental clutch teeth engageable upon such approach, whereby the cam rotatably drives the other member, and when the other member tends to rotate in the same direction faster than said cam, said follower member is repelled helically on said cam to separate said clutch teeth, the spring pressure being thereupon relieved so that the other member freely overruns the cam without drag by the spring.

4. Power transmission mechanism comprising a drive member, a helical cam, a radially expansible and contractible oppositely directed helical spring, a follower member associated with said cam, said members having complemental clutch teeth, said spring being non-rotatably connected to the follower member and arranged to exert a radial frictional grip on the drive member when the latter rotates faster than the cam in one direction, whereby, under such circumstances, the spring rotatably drives the follower member, causing the same to move axially on the cam toward the drive member until the teeth are clutched and thereby establish a positive drive between the drive member and the cam.

5. Power transmission mechanism comprising a drive member, a helical cam, a radially expansible and contractible oppositely directed helical spring, a follower member associated with said cam, said members having complemental clutch teeth, said spring being non-rotatably connected to the follower member and arranged to exert a radial frictional grip on the drive member when the latter rotates faster than the cam in one direction, whereby, under such circumstances, the spring rotatably drives the follower member, causing the same to move axially on the cam toward the drive member until the teeth are clutched and thereby establish a positive drive between the drive member and the cam, the part of said spring engaged with the drive member comprising contacting coils to maximize radial grip.

6. Power transmission mechanism comprising a drive member, a helical cam, a radially expansible and contractible oppositely directed helical spring, a follower member associated with said cam, said members having complemental clutch teeth, said spring being non-rotatably connected to the follower member and arranged to exert a radial frictional grip on the drive member when the latter rotates faster than the cam in one direction, whereby under such circumstances the spring rotatably drives the follower member, causing the same to move axially on the cam toward the drive member until the teeth are clutched and thereby establish a positive drive between the drive member and the cam, a part of the spring being disposed between and free of said members and comprising spaced coils, whereby said spring is axially energized when said drive member is driving the cam, so that when the cam tends to rotate faster than the drive member in the same direction, said spring is released and expands axially, thrusting the follower member teeth out of engagement with the drive member teeth, and said spring is reduced radially, thereby removing the drag against such faster rotation of the cam.

7. In a device of the class described, rotary drive and driven parts, a shiftable member arranged to drivably couple said parts, said member and one of said parts constituting cooperating elements of a clutch, yieldable means disposed so as to resist engagement of said clutch and having a one-way overrunning clutch relation to one of said elements and anchored to the other element and arranged so that when the drive part rotates in one direction relative to the driven part, said member is shifted to cause said means to yield and said clutch to be engaged, and thereby drive said driven part, and when the driven part rotates in the same direction and relative to the drive part, said means is operative to complete the disengagement of said clutch, enabling said driven part to overrun said drive part.

8. In a device of the class described, rotary drive and driven parts, a shiftable member arranged to drivably couple said parts, said member and one of said parts constituting cooperating elements of a clutch, yieldable means disposed so as to resist engagement of said clutch and having a one-way overrunning clutch relation to one of said elements and anchored to the other element and arranged so that when the drive part rotates in one direction relative to the driven part, said member is shifted to cause said means to yield and said clutch to be engaged, and thereby drive said driven part, and when the driven part rotates in the same direction and relative to the drive part, said means is operative to complete the disengagement of said clutch, enabling said driven part to overrun said drive part, said means being constructed and arranged to increase its grip on said one element when the drive part is driving the driven part and to decrease its grip when said driven part overruns said drive part.

9. In a device of the class described, rotary drive and driven parts, a shiftable member arranged to drivably couple said parts, said member and one of said parts constituting cooperating elements of a clutch, yieldable means disposed so as to resist engagement of said clutch and having one-way overrunning clutch relation to one of said elements and anchored to the other element and arranged so that when the drive part rotates in one direction relative to the driven part, said member is shifted to cause said means to yield and said clutch to be engaged, and thereby drive said driven part, and when the driven part rotates in the same direction and relative to the drive part, said means is operative to complete the disengagement of said clutch, enabling said driven part to overrun said drive part, said means comprising a coiled spring arranged to increase its grip on said one element when the drive part is driving the driven part and to decrease its grip when said driven part overruns said drive part, certain of the coils of said spring being spaced apart to allow said member to be shifted.

10. In a device of the class described, rotary drive and driven parts, a shiftable member arranged to drivably couple said parts, said member and one of said parts having teeth constituting cooperating elements of a clutch, a spring coaxially arranged relative to said parts resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch, enabling said driven part to overrun said drive part.

11. In a device of the class described, rotary drive and driven parts, a shiftable member arranged to drivably couple said parts, said member and one of said parts constituting cooperating elements of a clutch, means resisting engagement of said clutch and fractionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch, enabling said driven part to overrun said drive part, and instrumentalities for establishing a reverse drive for one of said parts.

12. In a device of the class described including rotary drive and driven parts and a shiftable member arranged to drivably couple said parts, said member and one of said parts constituting cooperating elements of a clutch, means resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch enabling said driven part to overrun said drive part, and instrumentalities for establishing a double directional drive between said parts.

13. In a device of the class described, rotary drive and driven parts, a shiftable member arranged to drivably couple said parts, said member and one of said parts constituting cooperating elements of a clutch, spring clutch means comprising a plurality of coils resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch, enabling said driven part to overrun said drive part, and instrumentalities for establishing a double directional drive between said parts and at the same time establishing a reverse drive for one of the parts.

14. In a device of the class described, rotary drive and driven parts, a shiftable member arranged to drivably couple said parts, said member and one of said parts constituting cooperating elements of a clutch, spring clutch means comprising a plurality of coils resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch, enabling said driven part to overrun said drive part, a member slidably splined on one of said elements, the other element being toothed to be engaged by said splined member, and means for shifting said splined member into toothed engagement with said toothed element while said splined member retains its splined relationship, whereby a double directional drive between said parts is established.

15. In a device of the class described, rotary drive and driven parts, a shiftable member arranged to drivably couple said parts, said member and one of said parts constituting cooperating elements of a clutch, spring clutch means comprising a plurality of coils resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch, enabling said driven part to overrun said drive part, a collar carried by one of said parts, said collar and the other part having cooperable peripheral teeth, a sleeve slidably splined on one of the last two instrumentalities, and means for shifting said sleeve into engagement with the teeth of the other of said two instrumentalities while said sleeve remains splined as aforesaid to establish a double directional drive between said parts.

16. In a device of the class described, rotary drive and driven parts, a shiftable member arranged to drivably couple said parts, said member and one of said parts constituting cooperating elements of a clutch, means resisting engagement of said clutch and frictionally engaged with one element and anchored to the other element and arranged so that when the drive part rotates in one direction relative to the driven part, said member is shifted to cause said clutch to be engaged, and when the driven part rotates in the same direction and relative to the drive part, said means is operative to complete the disengagement of said clutch enabling said driven part to overrun said drive part, a two-way clutch associated with said parts and including means movable in one direction to engage said two-way clutch, means shiftable in the direction opposite to that last mentioned to establish a reverse drive of said parts, and means operable by the shiftable means upon said movable means so as to cause said two-way clutch to be engaged and thereby establish a double directional drive between said parts.

17. Clutch structure comprising driving and driven members provided with teeth, a manually shiftable element mounted on one of said members and having teeth cooperable with the teeth of said members for providing a two-way drive between said members, a nut having a threaded relation to one of said members, said nut and the other of said members constituting the cooperating elements of a one-way clutch, yieldable means disposed so as to resist engagement of said clutch and arranged so that when the drive part of said one-way clutch rotates in one direction relative to said driven part of said one-way clutch said nut is shifted to cause said means to yield and said one-way clutch to be engaged to thereby set up a one-way drive and when the driven part of said one-way clutch rotates in the same direction and relative to said drive part said nut is shifted to disengage said one-way clutch.

18. Clutch structure comprising driving and driven shafts, a clutch member non-rotatably secured to one of said shafts, a nut having a threaded connection with the other of said shafts, said clutch member and said nut constituting cooperating elements of a one-way clutch, yieldable means disposed so as to resist engagement of said clutch and arranged so that when the driving part of said one-way clutch rotates in one direction relative to said driven part of said one-way clutch said nut is shifted to cause said means to yield and said one-way clutch to be engaged to thereby set up a one-way drive between said shafts and when the driven part of said one-way clutch rotates in the same direction and relative to said driving part of said one-way clutch said nut is shifted to disengage said one-way clutch, a second clutch member non-rotatably connected to that shaft on which said nut has a threaded connection, and a shiftable element mounted on one of said clutch members and having teeth cooperable with teeth on the other of said clutch members for providing a two-way driving connection between said shafts.

19. Clutch structure comprising driving and driven shafts, a hollow clutch member non-rotatably connected to one of said shafts, a nut having a threaded connection with one of said shafts and disposed internally of said hollow clutch member, said nut comprising a part of a one-way clutch the other part of which is non-rotatably connected to the other of said shafts, a yieldable means disposed so as to resist engagement of said one-way clutch and arranged so that when the driving part of said one-way clutch rotates in one direction relative to said driven part of said one-way clutch said nut is shifted to cause said means to yield and said one-way clutch to be engaged to thereby set up a one-way drive and when the driven part of said one-way clutch rotates in the same direction and relative to said drive part said nut is shifted to cause said one-way clutch to be disengaged, said hollow clutch member comprising an element of a two-way clutch including a shiftable element having radial projections cooperable with complementary radial projections carried by said hollow clutch member and the other of said shafts.

CARL F. RAUEN.